US009799147B1

(12) United States Patent
Chehadeh

(10) Patent No.: US 9,799,147 B1
(45) Date of Patent: Oct. 24, 2017

(54) INTERACTIVE SYSTEM FOR DECORATING TWO AND THREE DIMENSIONAL OBJECTS

(71) Applicant: Marwan Chehadeh, San Diego, CA (US)

(72) Inventor: Marwan Chehadeh, San Diego, CA (US)

( * ) Notice: Subject to any disclaimer, the term of this patent is extended or adjusted under 35 U.S.C. 154(b) by 1 day.

(21) Appl. No.: 15/162,374

(22) Filed: May 23, 2016

(51) Int. Cl.
*G06T 19/20* (2011.01)
*G06F 3/0481* (2013.01)
*G09B 11/00* (2006.01)
*G09B 19/00* (2006.01)

(52) U.S. Cl.
CPC .......... *G06T 19/20* (2013.01); *G06F 3/04815* (2013.01); *G09B 11/00* (2013.01); *G09B 19/00* (2013.01); *G06T 2200/24* (2013.01)

(58) Field of Classification Search
None
See application file for complete search history.

(56) References Cited

U.S. PATENT DOCUMENTS

| 2007/0146389 | A1* | 6/2007 | Distler | G06T 15/04 345/629 |
| 2011/0202481 | A1* | 8/2011 | Lang | G06Q 30/02 705/500 |
| 2016/0292911 | A1* | 10/2016 | Sparks | B29C 67/0088 |
| 2017/0147713 | A1* | 5/2017 | Reeves | G06T 19/20 |

OTHER PUBLICATIONS

Puchihar "Playing with the Artworks: Engaging with Art through an Augmented Reality Game"; CHI'16 Extended Abstracts, May 7-12, 2016, San Jose, CA, USA; ACM 978-1-4503-4082-3/16/05, pp. 1842-1847.*

* cited by examiner

*Primary Examiner* — Maurice L McDowell, Jr.
(74) *Attorney, Agent, or Firm* — Donn K. Harms

(57) ABSTRACT

A computer enabled method teaching a relation of two-dimensional depictions with three dimensional objects is provided. Users employ printed line drawings having sections thereon which may be colorized by the user. The colorized line drawings may then be electronically imaged and positioned upon video depictions of the three dimensional object as a viewable guide to the user during colorization of a physical rendition of the three dimensional object. The system may employ product packaging as the three dimensional object to defray costs and for contests and product promotion.

15 Claims, 8 Drawing Sheets

INTERACTIVE SYSTEM FOR DECORATING TWO AND THREE DIMENSIONAL OBJECTS

BACKGROUND OF THE INVENTION

1. Field of the Invention

The present invention relates generally to electronic to a software and computer enabled system for educating users such as children, about relationships between two dimensional and three dimensional objects. More particularly, the system provides users, such as children, a sequential method for learning relationships between two dimensional representations of three dimensional objects by enabling the user to decorate a three dimensional object such as a statue or product container, after first imparting a similar preliminary decorative look to a two dimensional representation of the three dimensional object. The system can be especially widely employed at minimal cost for learning coloring and crafting on 3D Models in sequential engineering steps, through the provision and use of product containers from manufacturers and similar commercial product and service providers.

2. Prior Art

In recent years, with the significant increase in computing power there has occurred a major change in the way children play. Where children used to play games with each other outdoors and indoors with physically employable components such as markers, bats, nets, and the line, in recent years in countries such as the United States, children have played less in a physical sense with each other and more in a computer created virtual world. With powerful computers engaged to colorful visual displays, games have become a virtual exercise using a mouse or pointer.

This same move from the physical realm to a one that is virtual has occurred in play such as coloring and decoration. Where formerly children would employ coloring books, with crayons or markers to decorate two dimensional depictions of objects, in recent years such creative play has moved to a more virtual mode, where children look at a computer display, and employ a cursor or finger to colorize areas of a depiction. With the advent of smartphones and pad computers in more recent years with powerful processors and high quality graphics, what formerly occurred using crayons and markers and glue and decorative material, is modernly accomplished using cursor or touch displays.

As a consequence, children who formerly may have been kept occupied in a restaurant or automobile using coloring books, and gaining hand to eye coordination using crayons and markers to decorate a printed image, now watch videos on a smartphone or pad computer, or use their finger to color areas of a screen. As can be surmised, using a finger or a cursor to decorate a virtual image on a display, does not help the child or other user to gain hand to eye coordination. Neither does the use of a computer to decorate allow the child or other user to learn techniques to impart colors to surfaces. It is these learned techniques such as brush strokes and hand actions with instruments themselves which also provide unique and extra means to decorate a surface or objet in a "style" of an artist.

Further, children or others who play or enjoy decorating surfaces using only a modern virtual image and cursor and finger directed color and decoration, fail to learn differences in decorating a two dimensional surface versus a three dimensional exterior of an object. Neither do they learn the relationship or different views which must be taken into consideration when decorating a two dimensional surface such as a page of a book, versus a three dimensional surface.

As such, their exists an unmet need, for the provision of a computer and software enabled system which may run on a network accessible server or a local device over the internet, which provides users such as children, the tactile experience of decorating two dimensional surfaces such as depictions of a cartoon character, or another object, in a fashion which can provide the visual, mental and tactile connection, to decoration of a similar or the same object, but in a three dimensional version which may be touched and held.

Such a system should be employable using home computers, pad computers, laptops, and smartphones, to allow users to relate visually and mentally, the differences and similarities between the same object depicted on paper in a two dimensional format, with the object in three dimensional form which may be held in their hand, or viewed on a display. In doing so, users such as children will be enabled to enjoy the tactile learning using coloring instruments such as crayons, to decorate a two dimensional rendition or a later-provided three dimensional object such as a favorite cartoon character or whimsical packaging of a favored treat. In this fashion users such as children will mentally learn the connections, similarities, and differences in decorating both two dimensional and three dimensional objects, in a fashion which will serve them well later on when working totally in a virtual format.

It should be noted, the forgoing examples of related art and limitations related therewith are intended to be illustrative and not exclusive, and they do not imply any limitations on the exercise system and method described and claimed herein. Various other limitations of the related art are already known or will become apparent to those skilled in the art upon a reading and understanding of the specification below and the accompanying drawings.

SUMMARY OF THE INVENTION

The present invention provides a computer and software enabled system providing users, such as children, an educational experience during play sessions wherein they decorate two dimensional representations of three dimensional objects. Using a combination of modern technology, for image manipulation, and interrelation of two dimensional decoration as a guide for subsequent decoration of a three dimensional object, users such as children are entertained, while concurrently learning a physical or tactile, visual, and mental correlation between the two types of object representation.

As shown herein, the system may be employed in any number of successive steps and arrangements of such steps, depending on the level of play versus the level of education desired for the user. Such steps can be adjusted in order, duration, and complexity depending upon the age and skill level of the child user. Further, it can also be adjusted to encourage and reinforce the mental learning technique through including actions requiring manual dexterity and hand and eye coordination, depending upon the user ability and the lesson desired for teaching of the user. Consequently, those skilled in the art will realize the steps illustrated in the drawings and described herein, can be adjusted to accomplish the overall goal of allowing users to play and decorate two dimensional representations of three dimensional objects, and thereafter use that two dimensional decorative pattern as a guide for decorating an actual or virtual representation of the two dimensional object.

The system herein can be easily implemented to widespread use through participation of commercial enterprises such as product manufacturers who provide product containers to users for hand decoration. Further it can also be widely employed at little or no cost to the user by participation of service providers such as restaurants, or product manufacturers, who can provide both two dimensional art for coloring, along with three dimensional objects such as mascots or cartoon characters with which a child may be very familiar from viewing in videos or online.

In such a situation as a child in a restaurant, pages of the two dimensional representation of a mascot can be provided for decoration by crayons or markers, or could be provided for decoration using a smartphone or pad computer connected to the restaurant network wirelessly. Subsequent to the child coloring in areas of the two dimensional representation on paper, which will keep them occupied at play during the restaurant visit, the child can be provided with a toy three-dimensional version of the object in the drawing, for decoration using markers and the two dimensional version they previously decorated as a guide.

Using a product manufacturer as a conduit for free implementation of the system, online printable or virtual two dimensional representations of product containers can be provided for download and printing or virtual decoration by the child over the internet. Thereafter, blank three dimensional versions of the same object the child has decorated using crayons or markers or a virtual computer generated mode of the two dimensional object can be purchased, and decorated by the child using the previously decorated two dimensional version as a guide.

Such could easily be implemented by providing the product containers using whimsical cartoon characters, for instance, which are covered with a shrink wrap label, which may be removed to reveal the exterior surface of the three dimensional object which matches the two dimensional version provided online. This mode of the system can be inexpensively implemented widely at little cost to parents and users in a manner which will encourage use in a learning experience for children, and would be especially well received by families normally unable to participate in such endeavors. Consequently, it is particularly preferred that manufacturers and service providers adopt and employ the system and thereby allow for widespread use.

As can be seen in the attached drawings and the detailed specification, the overall goal of the system herein, is to teach users both the relation between two dimensional objects with their three dimensional physical and virtual counterparts, as well as to allow users to learn in an interrelated fashion using decoration techniques and the hand and eye coordination related therewith. Concurrently visual learning takes place to yield a three tiered mode for a user such as a child, to learn.

In the general flow path of the system, in all modes of the system, the user is presented with an actual or virtual two dimensional representation of a three dimensional object. Subsequently they are provided an actual or virtual counterpart of the two dimensional object they have decorated in the two dimensional representation. Thereafter they use the two dimensional representation they have decorated, to similarly decorate the three dimensional object or virtual representation.

In other modes of the system, the flow path of user use and participation may vary, depending on the age or skill of the user, and whether either or both of the two dimensional and three dimensional representation of the object to be decorated, are virtually provided for computer aided decoration, or physically provided for actual user decoration using color tools such as crayons or markers. Thus an easy system for young users may be provided with less advanced steps, or a more tedious system encouraging concentration and learning of artistic technique and hand to eye coordination may also be provided for older or more skilled users.

As noted above, with commercial participation by manufacturers and service providers, any of these modes of the system herein may be provided for free or at very little cost to the users such as for crayons or markers to employ with provided two dimensional pages and three dimensional packages or cartoon characters or the like.

With respect to the above description, before explaining at least one preferred embodiment of the herein disclosed system for interrelating the decoration of two dimensional images with the subsequent decoration of actual or virtual three dimensional objects herein in detail, it is to be understood that the invention is not limited in its application to the details of construction and to the arrangement of the steps in the following description or illustrated in the drawings. The invention herein described is capable of other embodiments and of being practiced and carried out in various ways which will become obvious to those skilled in the art on reading this disclosure. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other electronic and software-enabled two dimensional play and decoration systems to relate with three dimensional objects and the methods and systems for carrying out the several purposes of the present disclosed system. It is important, therefore, that the claims be regarded as including such equivalent construction and methodology, and differing positioning of the steps in the method of the system, insofar as they do not depart from the spirit and scope of the present invention.

It is an object of the present invention is to provide a computer and software enabled system enabling users such as children, to draw and/or decorate both two dimensional and three dimensional objects, in a manner which is interrelated and therefor provides an educational experience to the users.

It is another object of the invention to provide such a system which may employed in a plurality of sequential steps in different manners to impart more or less learning, relative to play for the user.

It is a further object of this invention to employ two dimensional drawings for decoration to serve as a guide for subsequent decoration of a 3D real or virtual representations of the same object.

It is yet an additional object of this invention to relate two dimensional drawings of product containers for decoration as a guide to subsequent decoration of actual 3D containers for the same product, to encourage product manufacturers and service providers to participate in distributing both the 2D drawings and 3D actual objects for decoration, to enable widespread use at minimal cost to users such as children.

Further objectives of this invention will be brought out in the following part of the specification wherein detailed description is for the purpose of fully disclosing the invention without placing limitations thereon.

BRIEF DESCRIPTION OF DRAWING FIGURES

Figure 1:
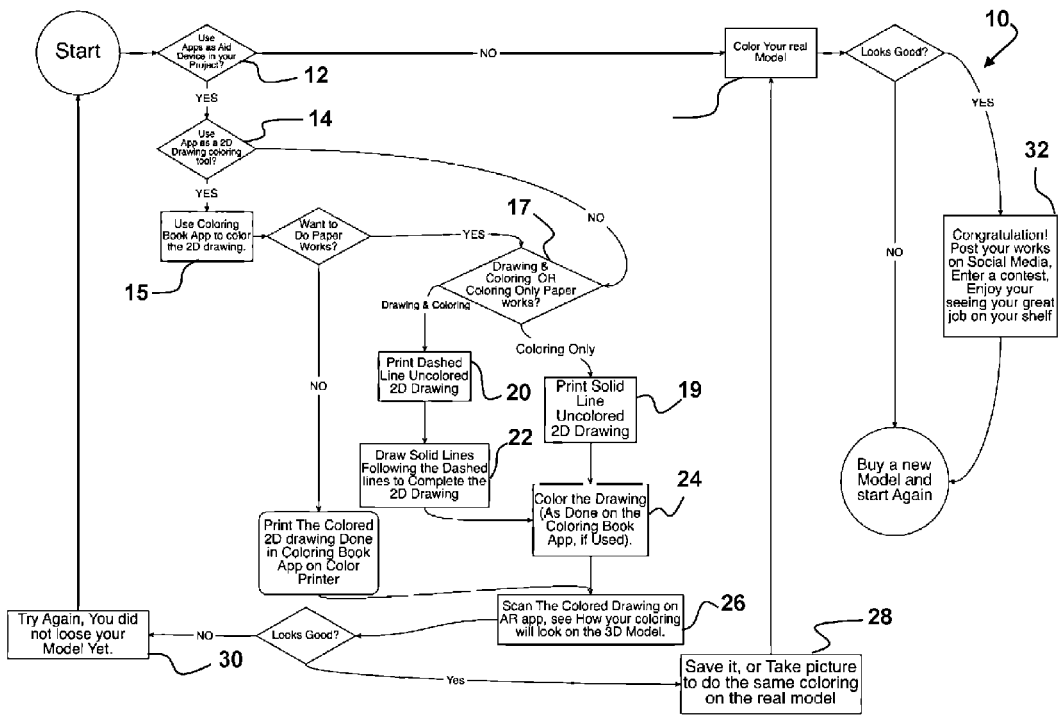
FIG. 1 depicts a graphical depiction of a general flow path of implementing the system herein showing the overall objective of providing users with two dimensional objects such as printed pages, to decorate as a guide for a subsequently provided three dimensional object.

It should be noted the steps in the system depicted in any of the figures, may be reordered and that other aspects of the present invention shall be more readily understood when considered in conjunction with the accompanying drawings, and the following detailed description, neither of which should be considered limiting.

DETAILED DESCRIPTION OF THE PREFERRED EMBODIMENTS OF THE INVENTION

In this description, any directional prepositions if employed, such as up, upwardly, down, downwardly, front, back, rear, top, upper, bottom, lower, left, right and other such terms refer to the device or depictions as such may be oriented are describing such as it appears in the drawings and are used for convenience only. Such terms of direction and location are not intended to be limiting or to imply that the device or method herein has to be used or positioned with graphics in any particular orientation. Further computer and network terms such as network, database, file, browser, media, digital files, videos, graphic interface, display, and other terms are for descriptive purposes only, and should not be considered limiting, due to the wide variance in the art as to such terms depending on which practitioner is employing them. The system herein should be considered to include any and all manner of software, firmware, operating systems, electronic memory, executable programs, digital files and file formats, databases, computer languages and the like, as would occur to one skilled in the art in any manner as they would be described to enable the system and method herein.

Now referring to drawings in FIG. 1 depicts a graphical depiction of a general flow path of implementing the system 10 herein showing the overall objective of providing users with two dimensional objects such as printed pages, to decorate as a guide for a subsequently provided three dimensional object. It should be noted that all of the flow charts are interrelated to the system and method herein to impart learning and fun to the user while providing an interrelated educational experience using physical, visual, and mental skills. Some steps may be skipped or rearranged depending on the age and skill of the user, or whether visual, mental, or physical skills are to be reenforced.

In one mode of the system 10 of FIG. 1, the user may choose 12 to employ a software generated 2D version of the three dimensional object in the form of a graphic interface 15 depicting on the display screen a two dimensional version of the three dimensional object, which the user may colorize. In a next step the user may choose to print on a local printer 17, a black and white version of the object they colorized in the graphic interface 15.

This user may choose to print a fully lined version 19 of the depiction of the object, or a dotted line 20 version of the object. For a dotted line version the user will first draw solid lines 22 to fill in the dotted outline. Once a solid line version of the object is printed 19 or drawn with solid lines 22, the user will colorize the drawing 24. It should be noted that if the graphic interface 15 was first colorized, this may be re depicted for the user as a guide to employ crayons or markers to colorize the drawing 24.

It is at this point that the system 10 will interrelate the user colorized drawing 24 to the three dimensional object. In this step, the colorized drawing 24 is scanned to a digital file 26 of the two dimensional colorized drawing of one side or both sides a three dimensional version of the object in the colorized drawing 24. Using software adapted to the task and running in electronic memory, the scanned digital file is "skinned" or electronically wrapped onto a graphic interface to form a colorized three dimensional graphic interface depiction of the three dimensional object 26.

This allows the user to view a provided graphic interface of a virtual three dimensional object bearing the colorizing they imparted to the two dimensional printed or virtual pages earlier, and decide whether it is finished to their liking 28 so it may be saved for subsequent use as a visual guide for hand colorizing an actual three dimensional model 16, or to start over 30 with new two dimensional renditions which they may colorize and repeat the sequence.

Once they have colorized the actual physical three dimensional object 16 if they decide it looks as they wish, they may photograph it digitally 32 and post it to social media, or if a manufacturer or service company is providing the two dimensional renditions and the three dimensional object for colorization, such as for example a candy container, the digital photograph 32 can be forwarded over a network to company for example in a contest to decorate the company cartoon character.

Thus the system 10 allows the user to colorize lined or dotted line two dimensional renditions of the three dimensional object which are then skinned to the graphic depiction of the three dimensional object, which if acceptable, may be employed as a graphic interface depicted guide, for hand colorizing the three dimensional object.

Figure 2:
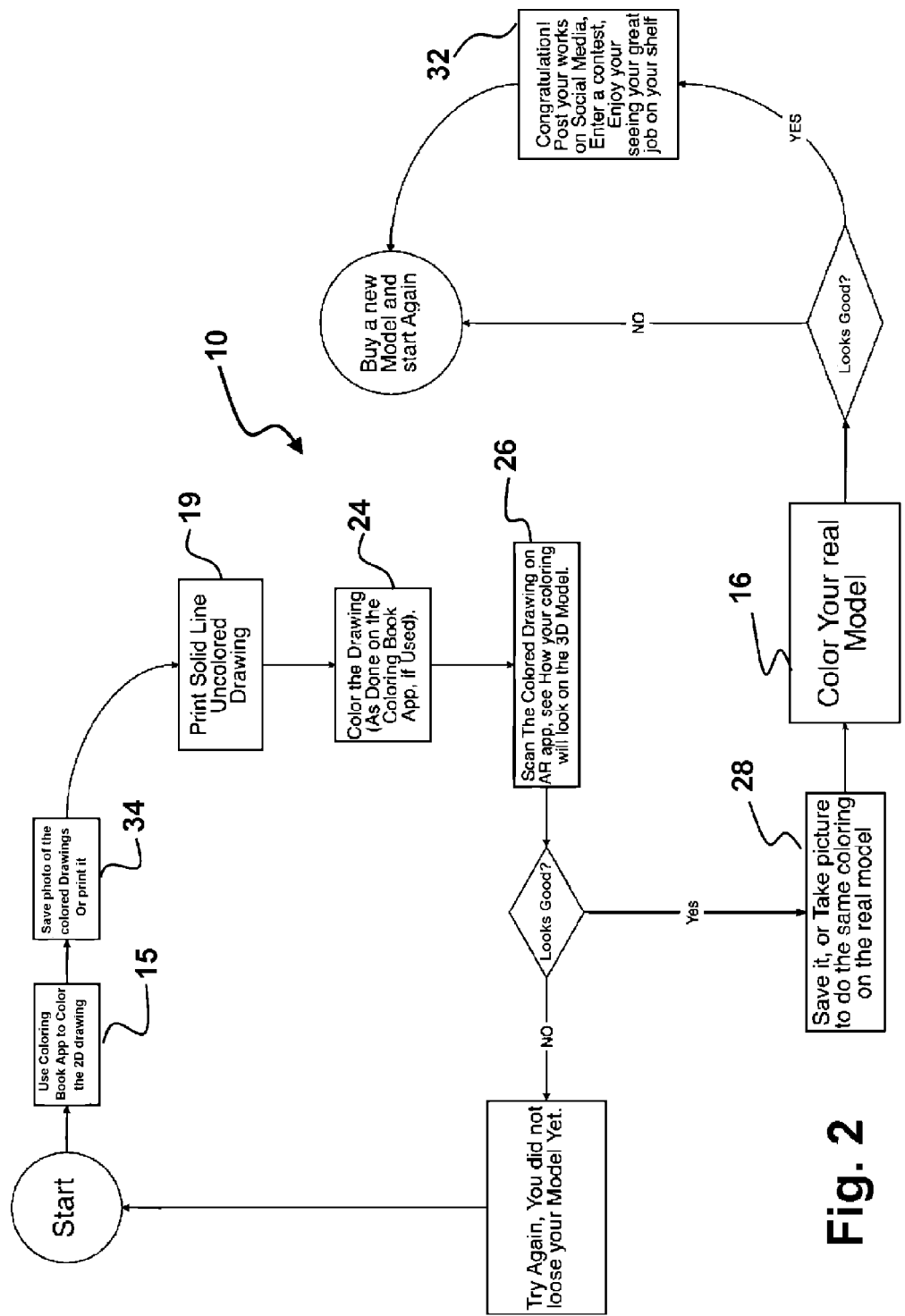
FIG. 2 is a graphic depiction of they system herein where a coloring book application is employed on a computing device and graphic interface to allow the user to first digitally color the image, use the digital version to color a printed page, and subsequently employ the printed page they have decorated as a guide to color an actual model of the object in the two dimensional images.

Shown in FIG. 2, the system 10 employs a software or an application running in electronic memory on a computing device engaged to a video display, as a digital coloring book 15, which the user will colorize using provided electronic means to do so which are well known, such as digitally depicted colored markers employable at the choice of the user to colorize parts of the drawing depicted in the digital coloring book 15.

Once colorized, the colorized page from the digital coloring book 15, is saved to electronic memory, and printed as a solid line uncolored drawing 19. Thereafter, the user using crayons or markers will form a colorized drawing 24 from the printed uncolored drawing, and may employ a graphic depiction of the colorized drawing from the coloring book 15 as a guide to fill in the printed version. The uncolored drawing 19 may be multiple renditions of two or multiple sides of the three dimensional object so the user may colorize all sides.

As with the first mode of the system 10, the colorized drawing 24 or drawings, are scanned to a digital format, and software adapted to employ the digital format of the colorized drawing 24 or drawings, will "skin" or position the digital surfaces in the proper position upon a graphic depiction of the three dimensional object 26, for the user to view. If the user views the graphic depiction and agrees it is finished, the graphic depiction of the three dimensional object bearing the skinned surface from the digital scan of the colorized images will be saved to electronic memory where it may be displayed in a guide graphic interface for the user to colorize the actual three dimensional object 16 using crayons or markers or other means to impart color to the exterior surface of the three dimensional object. Thereafter, a digital photo of the colorized three dimensional object may be communicated to the computer of the system 10, and uploaded to social media or sent to a contest, or otherwise communicated over a computer network to a destination of choice.

Figure 3:
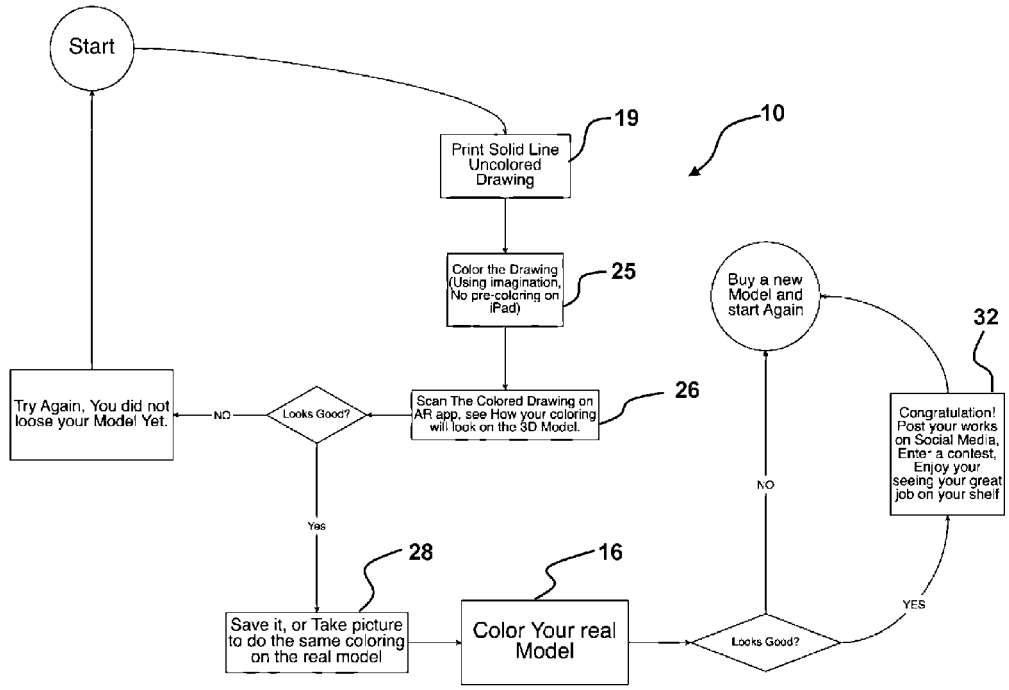
FIG. 3 shows the system herein wherein the user chooses a drawing to color from an online or computer database of such, and first colors the drawing and can choose to use it for decorating the three dimensional object or to re-decorate it before using it as the guide.

Shown in FIG. 3 is a simplified version of the system 10 where a solid line uncolored two dimensional drawing of a three dimensional object is provided the user 19. In this mode, the user simply colors the drawing 25 without using any graphic interface depiction of a pre-colored digital version as in the other modes. Once the user is finished the colorized drawing 25 or drawings, if more than one view has been colorized, are scanned to digital format, and employing software adapted to the task, the colorized drawing 25 or drawings, are positioned upon an exterior surface 26, of a three dimensional graphic depiction of the two dimensional object in the drawing 25. In this manner, as with the other modes of the system 10, the user can view a virtual graphic interface showing the three dimensional object decorated as in their drawings 25. If the user accepts the exterior surface 26 of the depicted three dimensional object, it is saved to electronic memory where it may be later depicted on the display as a guide while they color the actual three dimensional object 16.

Figure 4:
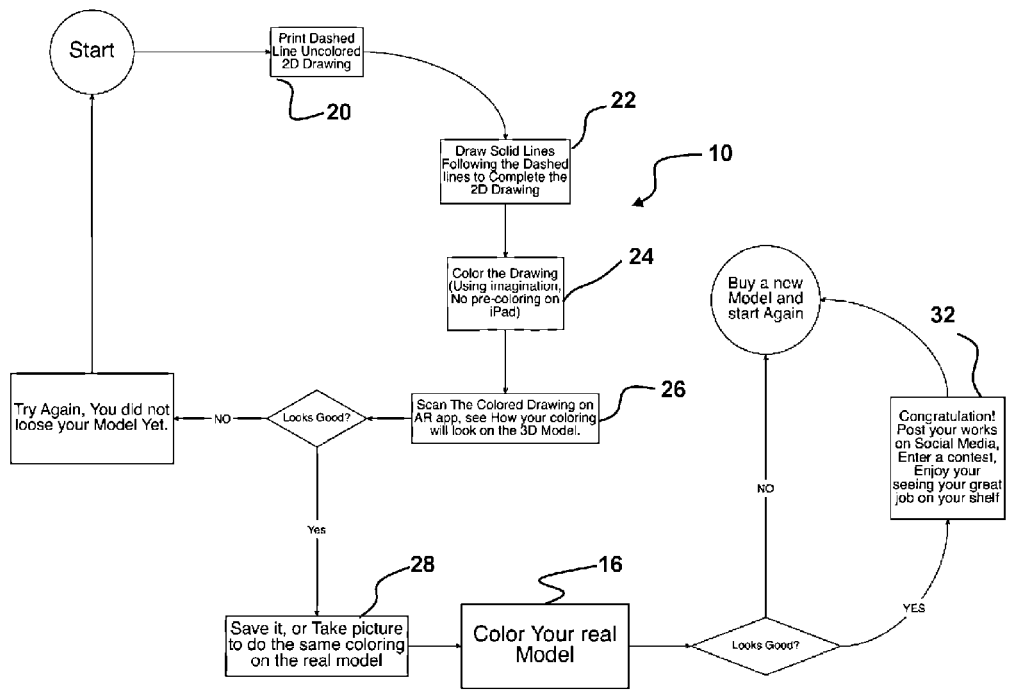
FIG. 4 shows the system wherein the user chooses an uncolored drawing from a library of such which is then printed. The printed drawing is then decorated by the user and may be saved to a digital image and stored for use as a guide to decorate the actual three dimensional model, or simply used for such without storage.

Shown in FIG. 4 is a mode of the system 10 which requires the user to first solidify the outline of the two dimensional rendition of the three dimensional object, by providing a dotted line outlined two dimensional rendition 20 which the user will make into solid lines by using a pen, pencil, or marker or the like, to follow the dashed lines and form solid lines 22 of the two dimensional rendering of the three dimensional object. This step helps the user such as a child better understand that the two dimensional object is drawn, and represents a three dimensional object. The system 10 may employ software adapted to the task of discerning whether the dashed lines have been joined to solid, before allowing the colorized document to be scanned and positioned in place upon a graphic interface representation of the colorized three dimensional object 26. Of course the two dimensional drawing of the object will first be colorized 24 by the user as in the other modes of the system. If the system does first employ photo or drawing recognition software to discern the dashed lines are solidified by the user, if they are not, it can reject the scan of the drawing and the step of rendering the colored drawing or drawings 24 onto the proper surface areas of the three dimensional object.

As with the other modes of the system 10, once the graphic interface is provided the user of the three dimensional object bearing the colors they imparted to the drawing or drawings 24, if the user approves, the assembled graphic interface depiction of the colorized three dimensional object, may be saved 28 to electronic memory and later provided to the user to view as a guide while actually coloring the exterior surface of the three dimensional object 16. Once finished and accepted by the user when they finish coloring the model 16, the colorized model may be photographed to an electronic photo file, and uploaded to social media, or to a contest website, or other sites chosen by the user. For example, a contest could be held by a candy company to colorize their cartoon or mascot which would be produced as the three dimensional object and given away or sold with product inside. The users would employ any mode of the system herein to colorize the provided three dimensional object and then submit it to the company holding the contest for judging. The three dimensional object might also be a product container with a removable shrink-wrap label so the users would buy the product and use the blank container for colorizing once the shrink wrap label is removed.

Figure 5:
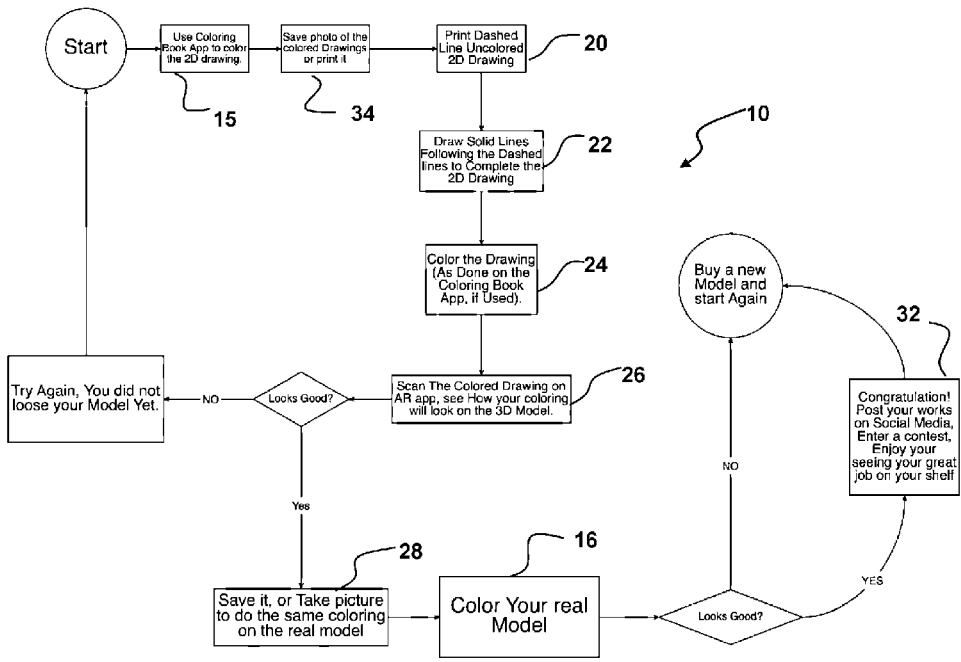
FIG. 5 shows the system wherein the user is also provided with a dotted line version of an un decorated version of the two dimensional object such as in FIG. 9, to include a step of drawing the dotted lines as solid before coloring in the figure for use subsequently as a guide to color an actual three dimensional object.

FIG. 5 depicts steps in the system 10 where a coloring book software application running on a computer with electronic memory and an engaged display would depict the two dimensional rendition of the three dimensional object, for colorizing, using the display screen 15. The user can touch portions of the depicted object to colorize them using colors which may be depicted on the screen or otherwise chosen which is well known. Once the user is finished, the colorized rendition may be saved to memory 34 and then the system 10 will print a dashed version of an uncolored rendition of the two dimensional drawing 20.

As in the other modes of the system 10, the user will join the dashed lines to form solid lines 22 and then color the drawing or drawings of the two dimensional rendition of the three dimensional object. As noted earlier, the multiple views or drawings may be printed of the uncolored rendition 20.

The colorized drawings in a next step, are scanned to an electronic or digital rendition of the colorized drawing, which using software adapted to the task, will position the colors the user placed on the drawing or drawings, in the proper positions upon the provided graphic interface showing a virtual mode of the three dimensional object 26. Viewing this rendition, if the user accepts it, the rendition may be saved to memory and immediately or later recalled and depicted on the video display 28 as a guide for the user during the step of hand coloring the actual three dimensional object 16. As noted above, using software adapted to examine the scanned images and discern solid or dashed lines, the system 10 can reject and not scan the colorized image if it discerns the dashes have not been joined.

Figure 6:
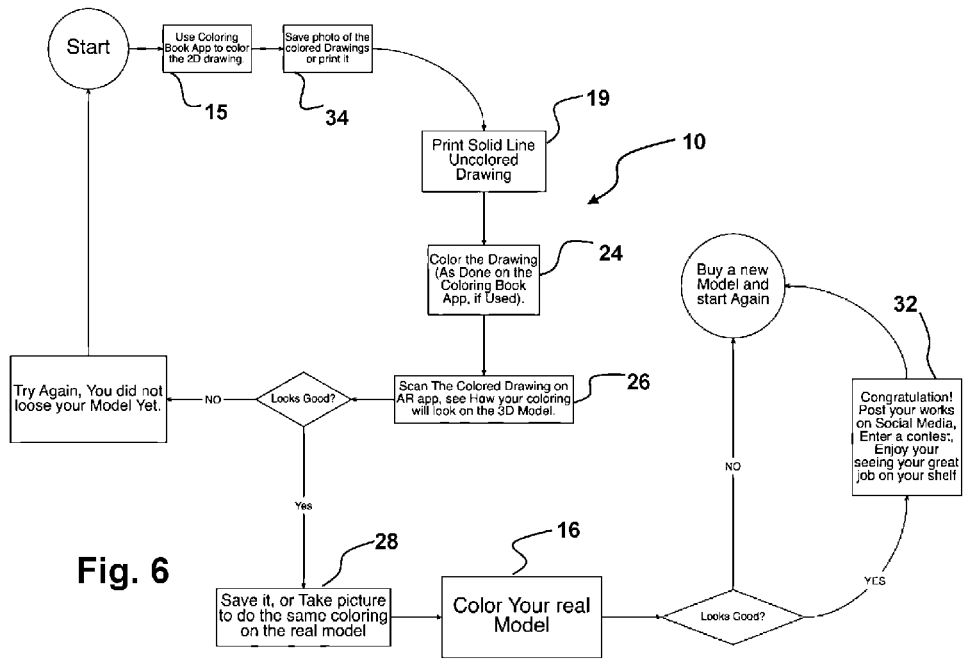
FIG. 6 shows a flow of the system wherein the user employs a digital version and graphic interface of a chosen object image to color and subsequently prints a paper two dimensional uncolored image for decoration, which may first be scanned to a digital image which software will depict as a three dimensional rendering for review before using it as a guide to color a three dimensional object.

A mode of the steps of the system 10 in another simple adaptation of that of FIG. 1, is shown in FIG. 6, which depicts steps in the system 10 where a coloring book software application running on a computer with electronic memory and an engaged display, would depict the two dimensional rendition of the three dimensional object, for colorizing, using the display screen 15. The user can touch portions of the depicted object to colorize them using colors which may be depicted on the screen or otherwise chosen which is well known. Once the user is finished, the colorized rendition may be saved to memory 34 and then the system 10 will print a solid line version of an uncolored rendition of the two dimensional drawing 19. In the next step, the user will color the drawing or drawings of the two dimensional rendition of the three dimensional object 24. As noted earlier, the multiple views or drawings may be printed of the uncolored rendition 19.

The colorized drawings in a next step, are scanned to an electronic or digital rendition of the colorized drawing, which using software adapted to the task, will position the colors the user placed on the drawing or drawings, as a skin or coloring in the proper positions upon a depicted graphic interface showing a virtual mode of the three dimensional object 26. Viewing this rendition if the user accepts it, the rendition may be saved to memory and immediately or later re depicted on the video display 28, as a guide, for the user during the step of hand coloring the actual three dimensional object 16. As in the other modes, the user can digitally photograph the colorized three dimensional object 32 and upload a digital photo of the three dimensional object to the system for communication over a computer network to social media websites, or as noted to a contest website or the like.

Figure 7:
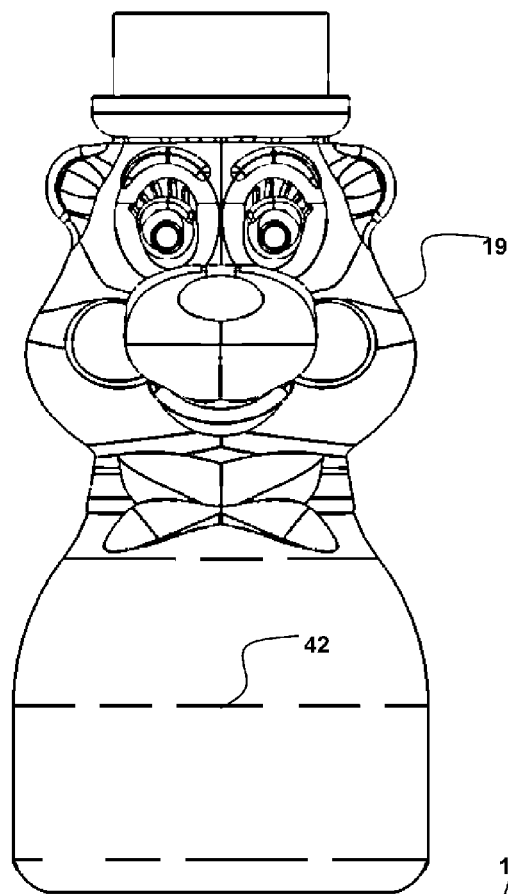
FIG. 7 shows frontal view of a depiction of a side of a later provided three dimensional object of FIGS. 9-10 which may include dotted lines for completion prior to coloring the image for use as a guide for coloring the three dimensional object.
Figure 8:
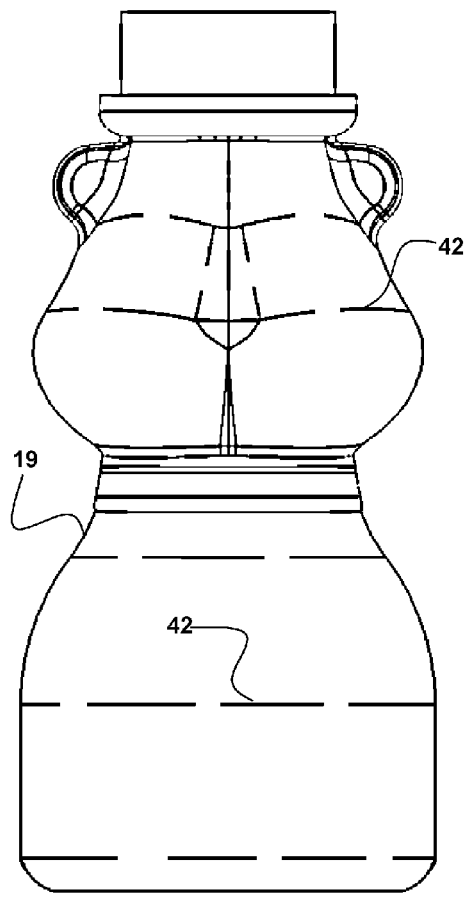
FIG. 8 shows a rear view of the two dimensional depiction of FIG. 7.

Shown in FIG. 7, is frontal view of a printed depiction of a solid line uncolored drawing 19 of a three dimensional object the user will be colorizing in the steps herein. FIG. 8 shows a rear view of the uncolored drawing 19 which the user would also colorize and there may be more views required for the software adapted to the task of taking scans of the colorized drawings and imparting them to the appropriate areas of a virtually depicted three dimensional object. The shown dotted lines or other indicia may be imparted to the uncolored drawings 19 or 20, to allow the software adapted to the task of colorizing the three dimensional model, using scans of the colored drawings, to ascertain the areas of the three dimensional object, matching the colorized areas of the two dimensional drawings. Such indicia might be lines drawn in ink which is invisible under normal light but visible in the digital image of a scan for example, or other modes to position the colored portions properly well known in the art.

Figure 9:
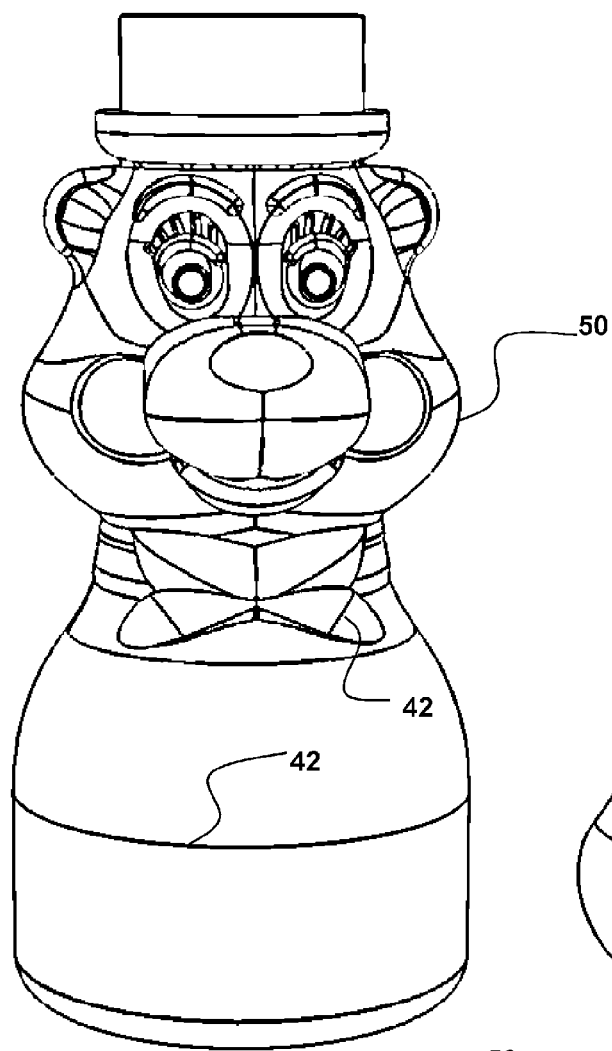
FIG. 9 shows a three dimensional object provided the user to decorate and color using the previously colored and decorated two dimensional version such as in FIGS. 7-8.
Figure 10:
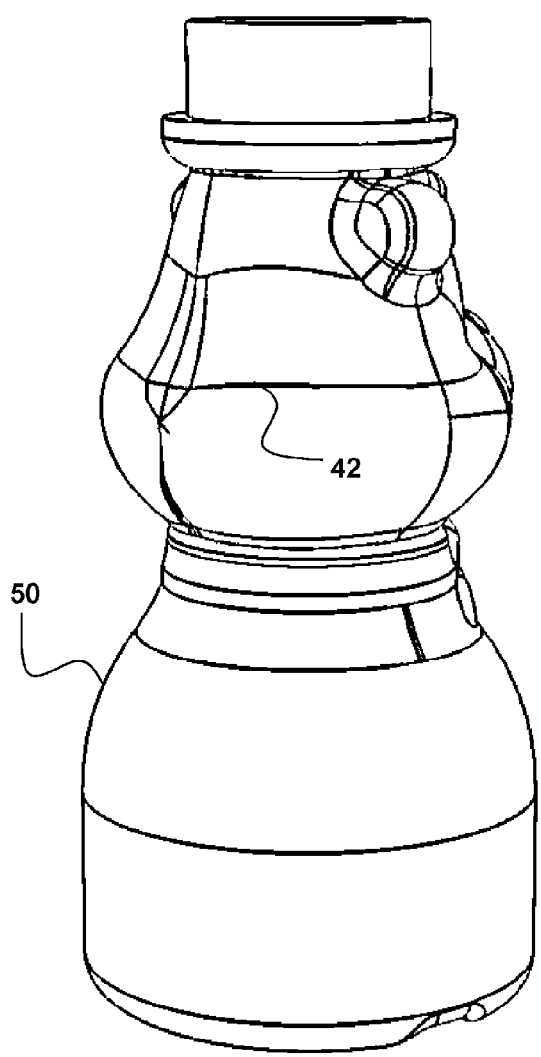
FIG. 10 shows a rear and side perspective view of the three dimensional object of FIG. 9.

FIG. 9 shows a frontal view of the actual three dimensional object 50 and FIG. 10 shows a perspective view. Also shown are lines 42 on the edges and interior areas of the three dimensional object, which would match the lined sections of the two dimensional drawings. This will allow the user to colorized the areas within the lines 42 which will match areas within lined two dimensional drawing versions the user has colored in the steps herein be the dashed line version or solid line version. Such lines 42 can also enable the software adapted to use a scan of the two dimensional colorized drawings to place the color in the virtual rendition in the proper areas.

Figure 11:
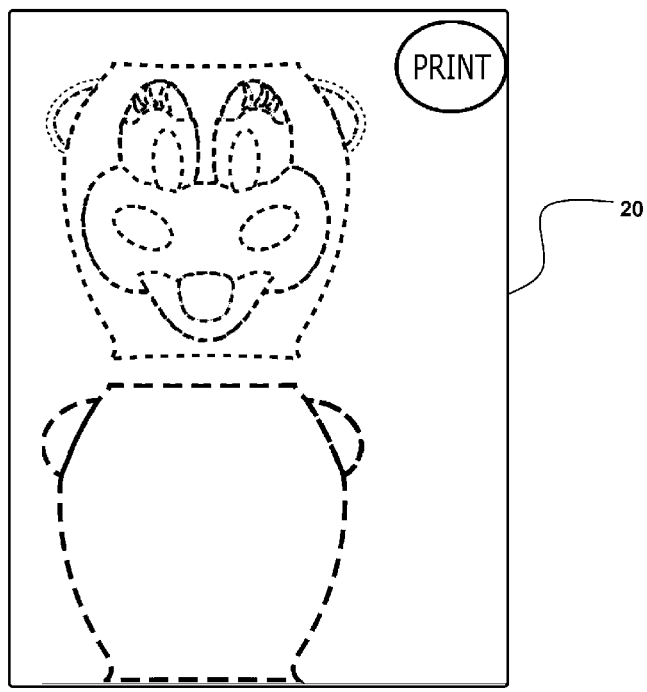
FIG. 11 shows a graphic interface of the system allowing the user to print a two dimensional rendition of the model which is in dotted line for user completion to give the user tactile, visual, and mental instruction as to the shape of the model and to interface these three learning traits.
Figure 12:
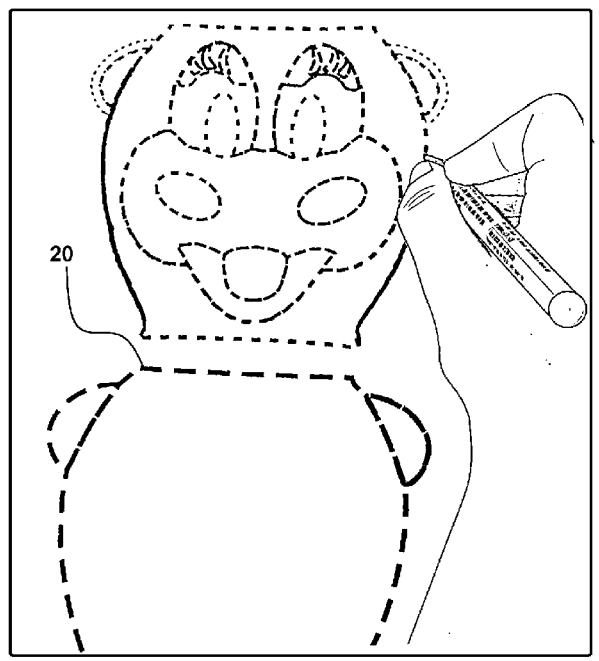
FIG. 12 shows the user following the dotted line rendition printed from FIG. 11.

FIGS. 11 and 12 show the dashed line versions of the two dimensional drawings which may be displayed and printed for the user. FIG. 11 is an example of a graphic interface that can be provided the user, to indicate they wish to print the dashed line version of the drawing rather than solid line. As shown in FIG. 12, the user is taking the step of joining the dashed lines to form solid lines.

Figure 13:
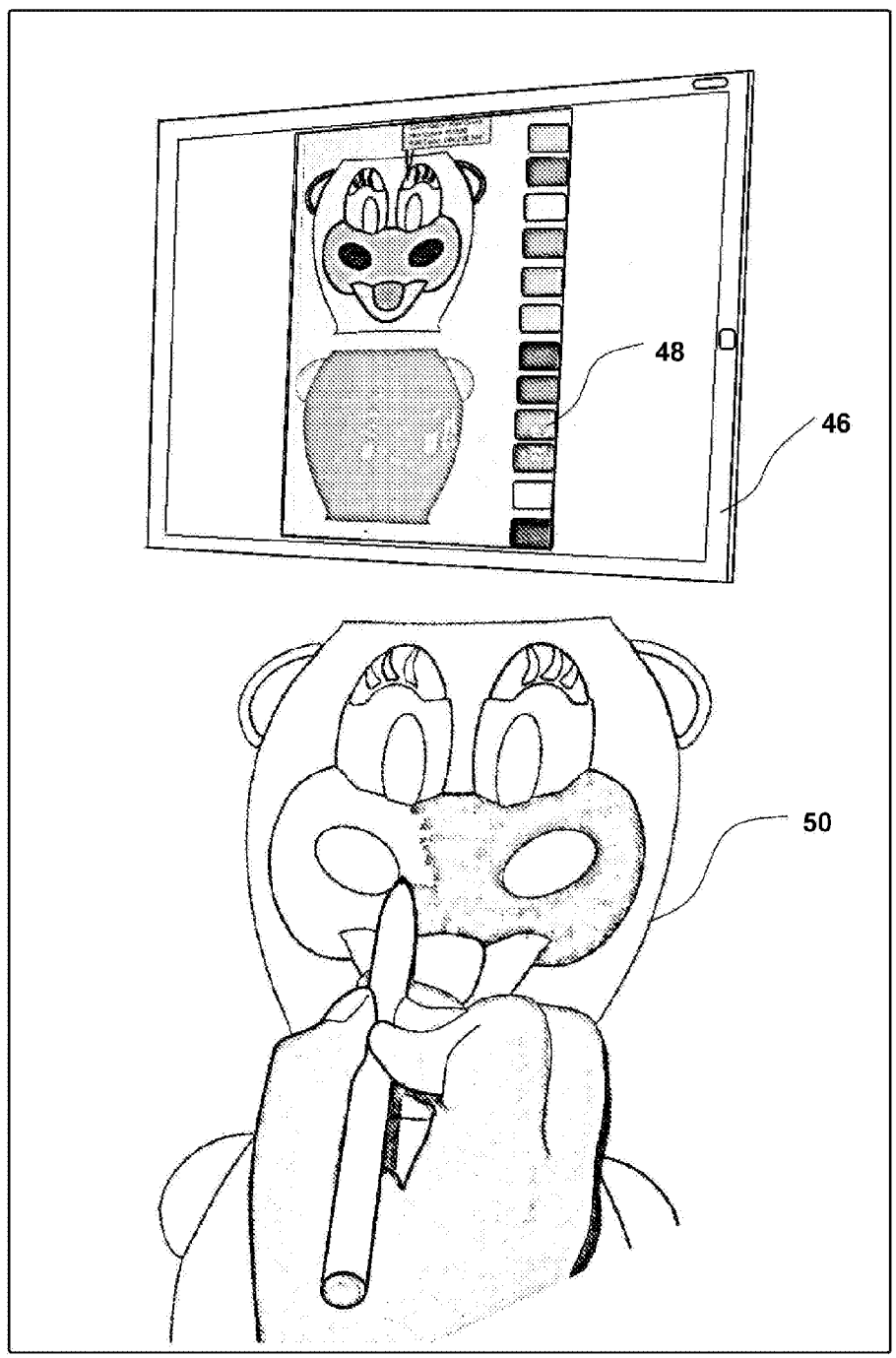
FIG. 13 depicts the system providing a colorized graphic interface of the three dimensional model as a guide for the user who is imparting colorization to the three dimensional object.

FIG. 13 depicts the system providing the graphic interface 46 of the two dimensional object which the user can colorize on a computer display, showing colors in squares 48 which may be chosen to colorized areas of the drawing in the digital coloring book mode. Also depicted in FIG. 13, is a user colorizing an actual three dimensional object 50 in the step of the system where colorized renditions of the two dimensional drawing, whether colorized digitally or scanned and placed on the virtual three dimensional object, may be viewed while using markers, pens, brushes, or the like to colorize the three dimensional object 50.

While all of the fundamental characteristics and features of the two dimensional coloring for use as a guide for decorating a three dimensional object in the system herein have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that upon reading this disclosure and becoming aware of the disclosed novel and useful system, various substitutions, modifications, and variations may occur to and be made by those skilled in the art without departing from the spirit or scope of the invention. Consequently, all such modifications and variations and substitutions, as would occur to those skilled in the art are considered included within the scope of the invention as defined by the following claims.

What is claimed is:

1. A method teaching a relation of two dimensional depictions with three dimensional objects employing a computer having electronic memory, comprising:

providing a printed drawing having lines depicting an object and having said lines forming sections for user imparted colorization;

electronically imaging the printed drawing subsequent to colorization of said sections by said user to form an electronic image file of said printed drawing storable in said electronic memory accessible to said computer;

employing software running in said electronic memory accessible to said computer which is adapted to the task of positioning said electronic image file of said printed drawing, upon a three dimensional graphic depiction of said object which is storable in electronic memory;

providing a three dimensional physical form of said object to said user with a colorable exterior surface; and communicating to an electronic video display viewable by said user, said three dimensional graphic depiction of said object, for employment by said user as a viewable guide for colorizing said three dimensional physical form of said object to form a colorized object.

2. The method of claim 1, also including the steps of:
providing said printed drawing where said lines of said drawing are formed of dashes having spaces therebetween; and
having said user first draw upon said lines having dashes with spaces therebetween, to thereby render said lines as solid lines having no said spaces.

3. The method of claim 2, also including the steps of:
prior to providing said printed drawing, providing a graphic interface of said printed drawing upon a video display;
providing a graphic interface allowing said user configured to allow said user to colorize sections of said graphic interface of said printed drawing, and thereby form a colorized graphic interface of said printed drawing storable in electronic memory; and
depicting on a video display viewable by said user, said colorized graphic interface of said printed drawing, as a viewable guide for said user during colorization of said sections of said printed drawing.

4. The method of claim 3 additionally comprising the steps of:
providing a product container as said three dimensional physical form of said object to said user with said colorable exterior surface.

5. The method of claim 3 additionally comprising the step of:
capturing an electronic image of said colorized object storable in electronic memory; and
communicating said electronic image of said colorized object to social media websites or contest websites.

6. The method of claim 2 additionally comprising the steps of:
providing a product container as said three dimensional physical form of said object to said user with said colorable exterior surface.

7. The method of claim 6 additionally comprising the step of:
employing software adapted to the task of examining said electronic imaging of said printed drawing to ascertain if said lines having dashes and spaces have been drawn upon by said user to form said solid lines having no spaces, before storing said electronic image of said printed drawing in electronic memory.

8. The method of claim 2 additionally comprising the step of:
capturing an electronic image of said colorized object storable in electronic memory; and
communicating said electronic image of said colorized object to social media websites or contest websites.

9. The method of claim 2 additionally comprising the step of:
employing software adapted to the task of examining said electronic imaging of said printed drawing to ascertain if said lines having dashes and spaces have been drawn upon by said user to form said solid lines having no spaces, before storing said electronic image of said printed drawing in electronic memory.

10. The method of claim 1, also including the steps of:
prior to providing said printed drawing, providing a graphic interface of said printed drawing upon a video display;
providing a graphic interface allowing said user configured to allow said user to colorize sections of said graphic interface of said printed drawing, and thereby form a colorized graphic interface of said printed drawing storable in electronic memory; and
depicting on a video display viewable by said user, said colorized graphic interface of said printed drawing, as a viewable guide for said user during colorization of said sections of said printed drawing.

11. The method of claim 10 additionally comprising the steps of:
providing a product container as said three dimensional physical form of said object to said user with said colorable exterior surface.

12. The method of claim 10 additionally comprising the step of:
capturing an electronic image of said colorized object storable in electronic memory; and
communicating said electronic image of said colorized object to social media websites or contest websites.

13. The method of claim 1 additionally comprising the steps of:
providing a product container as said three dimensional physical form of said object to said user with said colorable exterior surface.

14. The method of claim 13 additionally comprising the step of:
capturing an electronic image of said colorized object storable in electronic memory; and
communicating said electronic image of said colorized object to social media websites or contest websites.

15. The method of claim 1 additionally comprising the step of:
capturing an electronic image of said colorized object storable in electronic memory; and
communicating said electronic image of said colorized object to social media websites or contest websites.

* * * * *